US011362342B2

(12) United States Patent
Matsutani

(10) Patent No.: US 11,362,342 B2
(45) Date of Patent: Jun. 14, 2022

(54) CATALYST FOR SOLID POLYMER FUEL CELLS AND METHOD FOR PRODUCING THE SAME

(71) Applicant: TANAKA KIKINZOKU KOGYO K.K., Tokyo (JP)

(72) Inventor: Koichi Matsutani, Hiratsuka (JP)

(73) Assignee: TANAKA KIKINZOKU KOGYO K.K., Tokyo (JP)

(*) Notice: Subject to any disclaimer, the term of this patent is extended or adjusted under 35 U.S.C. 154(b) by 269 days.

(21) Appl. No.: 16/492,734

(22) PCT Filed: Apr. 16, 2018

(86) PCT No.: PCT/JP2018/015644
§ 371 (c)(1),
(2) Date: Sep. 10, 2019

(87) PCT Pub. No.: WO2018/194007
PCT Pub. Date: Oct. 25, 2018

(65) Prior Publication Data
US 2021/0143444 A1    May 13, 2021

(30) Foreign Application Priority Data
Apr. 18, 2017 (JP) .............. JP2017-081893

(51) Int. Cl.
*H01M 4/00* (2006.01)
*H01M 4/92* (2006.01)
*H01M 8/10* (2016.01)

(52) U.S. Cl.
CPC .... *H01M 4/926* (2013.01); *H01M 2008/1095* (2013.01); *H01M 2300/0082* (2013.01)

(58) Field of Classification Search
CPC . Y02E 60/50; H01M 2300/0082; H01M 8/10; H01M 2008/1095; H01M 4/88
See application file for complete search history.

(56) References Cited

U.S. PATENT DOCUMENTS

| 6,379,834 B1 | 4/2002 | Giallombardo et al. |
| 2003/0045425 A1 | 3/2003 | Ruth et al. |

(Continued)

FOREIGN PATENT DOCUMENTS

| JP | H08-84930 A | 4/1996 |
| JP | H09-47659 A | 2/1997 |

(Continued)

OTHER PUBLICATIONS

Extended European Search Report dated Mar. 17, 2020 for corresponding European Patent Application No. 18787659.4.
(Continued)

*Primary Examiner* — Cynthia H Kelly
*Assistant Examiner* — Monique M Wills
(74) *Attorney, Agent, or Firm* — Foley & Lardner LLP

(57) ABSTRACT

The present invention relates to a catalyst for solid polymer fuel cells in which catalyst particles including platinum are supported on a carbon powder carrier. The invention provides a catalyst for solid polymer fuel cells in which the ratio of zerovalent platinum to platinum present on the surfaces of the catalyst particles is 80% or more and 100% or less. In the platinum catalyst, excellent durability is exhibited in an environment of operating a solid polymer fuel cell, and the amount of platinum eluted at the time of immersing the catalyst in a predetermined sulfuric acid solution is lower as compared to conventional platinum catalysts. The invention provides a catalyst for solid polymer fuel cells excellent in both initial activity and durability.

19 Claims, 4 Drawing Sheets

(56) References Cited

U.S. PATENT DOCUMENTS

| | | |
|---|---|---|
| 2005/0101481 A1 | 5/2005 | Ruth et al. |
| 2005/0112057 A1* | 5/2005 | Okuno .................. C01B 3/40 |
| | | 423/651 |
| 2007/0003822 A1 | 1/2007 | Kocha et al. |
| 2009/0029216 A1 | 1/2009 | Yamamoto |
| 2013/0244137 A1 | 9/2013 | Tada et al. |
| 2016/0276674 A1* | 9/2016 | Xia .................. B01J 23/44 |

FOREIGN PATENT DOCUMENTS

| | | |
|---|---|---|
| JP | 2003-024798 A | 1/2003 |
| JP | 2003-257439 A | 9/2003 |
| JP | 3516734 B2 | 4/2004 |
| JP | 3683623 B2 | 8/2005 |
| JP | 2009-500789 A | 1/2009 |
| WO | WO-2006/088194 A1 | 8/2006 |

OTHER PUBLICATIONS

International Searching Authority, "International Search Report," issued in connection with International Patent Application No. PCT/JP2018/015644, dated Jul. 10, 2018.

International Searching Authority, "Written Opinion," issued in connection with International Patent Application No. PCT/JP2018/015644, dated Jul. 10, 2018.

* cited by examiner

EXAMPLE 2

EXAMPLE 3

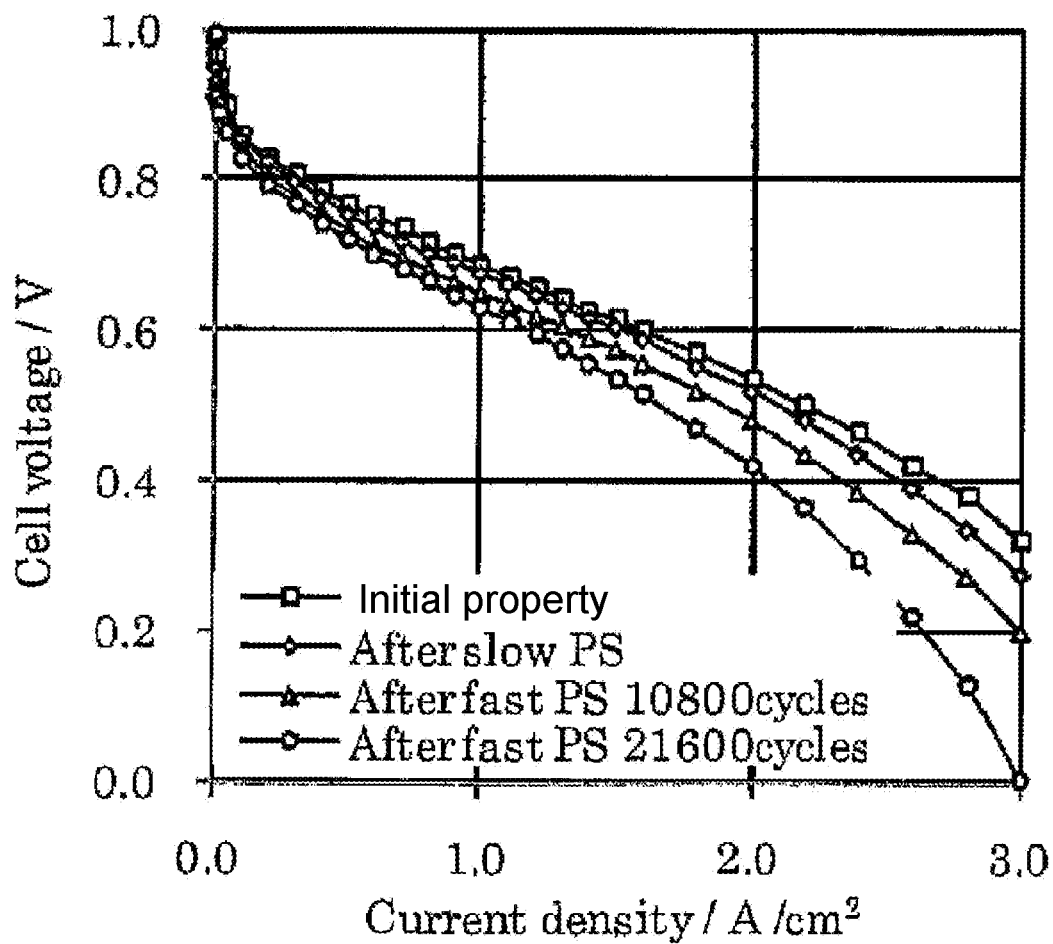

CATALYST FOR SOLID POLYMER FUEL CELLS AND METHOD FOR PRODUCING THE SAME

RELATED APPLICATIONS

The present application claims priority under 37 U.S.C. § 371 to International Patent Application No. PCT/JP2018/015644, filed Apr. 16, 2018, which claims priority to and the benefit of Japanese Patent Application No. 2017-081893, filed on Apr. 18, 2017. The contents of these applications are hereby incorporated by reference in their entireties.

TECHNICAL FIELD

The present invention relates to a catalyst for solid polymer fuel cells. Particularly, the present invention relates to a catalyst which is suitably used in cathodes (air electrodes) for solid polymer fuel cells.

BACKGROUND ART

Practical realization of fuel cells once termed as future power generation systems have come to be realistic as expected, and at present, popularization of fuel cells is desired. Fuel cells are classified into several types, and in particular, solid polymer fuel cells have the advantage of operating at a low temperature and having a small size. Thanks to such an advantage, solid polymer fuel cells are considered as promising automobile power sources and domestic power sources. A solid polymer fuel cell has a layered structure in which a solid polymer electrolyte membrane is sandwiched between a hydrogen electrode (anode) and an air electrode (cathode). Hydrogen as a fuel and air (oxygen) are supplied to the hydrogen electrode and the air electrode, and power is generated by means of oxidation and reduction reactions taking place at the electrodes. In addition, a mixture of a solid electrolyte and a catalyst for accelerating electrochemical reaction is generally applied for both the electrodes.

As catalysts for forming the electrodes, catalysts are widely used in which a precious metal, particularly platinum, is supported as a catalyst metal. This is because platinum as a catalyst metal has high activity in acceleration of electrode reaction at both a fuel electrode and a hydrogen electrode.

The applicant of the present invention has heretofore developed and disclosed many catalysts for solid polymer fuel cells and methods for producing the catalysts. Regarding the platinum catalyst described above, for example, methods have been disclosed in which platinum is supported on a carrier by a liquid phase reduction method (chemical reduction method) with a predetermined platinum as a raw material (Patent Documents 1 and 2). These methods for producing a catalyst are basic techniques for producing platinum catalysts capable of exhibiting suitable activity, and provide fundamental techniques for subsequently developed platinum catalysts.

RELATED ART DOCUMENT

Patent Documents

Patent Document 1: JP 3516734 B2
Patent Document 2: JP 3683623 B2

SUMMARY OF THE INVENTION

Problems to be Solved by the Invention

Results so far achieved regarding practical realization of solid polymer fuel cells are thanks to accumulation of many conventional arts. Continuous studies for improvement of catalyst properties will be required for further popularization of solid polymer fuel cells.

Here, examples of the properties required for solid polymer fuel cell include favorable initial activity, and also durability, that is, sustainability of catalytic activity. Catalysts cannot be prevented from undergoing reduction of activity (deactivation) which occurs with elapse of time, and prolongation of time until deactivation may be essential for practical realization and popularization of fuel cells. In particular, cathode catalysts for solid polymer fuel cells are used under the severe conditions of being exposed to a strong-acidic atmosphere and placed under a high potential load at a relatively high temperature of about 80° C. In addition, cathode electrodes are significantly affected by load variations during operation of fuel cells. Therefore, enhancement of durability of catalysts for solid polymer fuel cells is of great importance for promoting utilization of fuel cells.

The present invention has been made against the background of the above-mentioned situations, and an object of the present invention is to provide a catalyst for solid polymer fuel cells in which platinum is used as a catalyst metal, the catalyst having improved durability while essentially having initial activity equal to or higher than that in conventional arts.

Means for Solving the Problems

Studies conducted by the present inventors revealed that the conventional platinum catalyst produced by a liquid phase reduction method had platinum oxide-derived divalent or tetravalent platinum present on a surface of platinum in the form of catalyst particles. This phenomenon itself is not inconceivable when considering the content of the liquid phase reduction method in which a platinum catalyst is supported on a carrier, and reduction treatment is then performed. However, influences of the presence of divalent or tetravalent platinum on catalyst properties have not been known heretofore. Here, the present inventors arrived at the following through on the premise that the presence of divalent or tetravalent platinum affects the durability of a catalyst.

That is, in a catalyst for solid polymer fuel cells, the platinum oxide on the surfaces of catalyst particles is preferentially dissolved due to influences by a use environment of the catalyst, particularly influences at the time of undergoing an environment change caused by variations in load. The dissolution of platinum oxide decreases the amount of platinum in the catalyst, resulting in degradation (reduction of activation) of the catalyst.

Thus, the present inventors extensively conducted studies on a method for enhancing the durability of a catalyst by optimizing the state of platinum on the surfaces of catalyst particles while having its basis in a liquid phase reduction method. While the method for producing a catalyst will be described later, the present inventors found that in a catalyst produced under predetermined conditions, a ratio of zerovalent platinum on the surfaces of catalyst particles is not lower than a certain level, and favorable initial activity and durability are exhibited. Thus, the present inventors arrived at the present invention.

That is, for solving the above-described problems, the present invention provides a catalyst for solid polymer fuel cells in which catalyst particles including platinum are supported on a carbon powder carrier, and in the catalyst for solid polymer fuel cells, a ratio of zerovalent platinum to platinum present on the surfaces of the catalyst particles is 80% or more and 100% or less.

Hereinafter, a catalyst for solid polymer fuel cells according to the present invention will be described. The basic configuration of the catalyst in the present invention is the same as that of a conventional platinum catalyst. That is, the catalyst for solid polymer fuel cells of the present invention includes a carbon powder carrier and catalyst particles including platinum.

In the present invention, the ratio of zerovalent platinum on the surfaces of the catalyst particles is 80% or more. It is considered that in a catalyst obtained by a conventional liquid phase reduction method, divalent or tetravalent platinum is present in an amount of about 20 to 30% on the surfaces of catalyst particles, and forms platinum oxide as described above. The platinum oxide is considered to derive from a platinum compound (platinum complex) which is a precursor of catalyst particles. In the present invention, a catalyst excellent in durability can be obtained by converting the platinum oxide into atomic platinum to adjust the surface state of the catalyst particles. The upper limit of the ratio of the zerovalent platinum is 100%. The ratio of the zerovalent platinum is more preferably 90% or more.

Examples of the method for measuring the ratio of zerovalent platinum on the surfaces of catalyst particles include a method in which a catalyst is subjected to X-ray photoelectron spectroscopic analysis (XPS), and the ratio of platinum is determined on the basis of a Pt4f spectrum measured from the catalyst. Here, since the waveform of the resulting spectrum is a mixed waveform of spectra derived from platinum in the states of zerovalent platinum, divalent platinum and tetravalent platinum, the waveforms of the measured spectra are separated on the basis of peak positions corresponding to the states, individual peak areas are calculated, and the ratio of zerovalent platinum atoms is calculated from the ratio of the peak areas. In XPS analysis, the Pt4f spectrum can be measured over a range from 67 eV to 87 eV. By setting peak positions at 71.8 eV (zerovalent platinum), 72.8 eV (divalent platinum) and 74.6 eV (tetravalent platinum) in the separation of waveforms, a ratio of zerovalent platinum (peak area ratio) can be obtained.

Preferably, the catalyst particles in the present invention have an average particle size of 2 to 20 nm. When the average particle size is less than 2 nm, long-time activity sustainability cannot be reliably obtained, and when the average particle size is more than 20 nm, the catalyst cannot exhibit sufficient initial activity. The average particle size of the catalyst particles is more preferably 3 to 10 nm, still more preferably 3 to 5 nm, especially preferably 4 to 5 nm. The average particle size of catalyst particles is a particle size of only active metal (platinum) particles, which is a size of connected crystals (also referred to as a crystallite diameter), and does not include the particle size of a carrier. The catalyst particle size can be calculated from an XRD peak half width in accordance with the following Scherrer equation.

$$R = 0.9\lambda/(W \cos \theta) \quad \text{[Formula 1]}$$

(R: particle size (crystallite diameter)/nm, A: wavelength of X-ray used (for example, 0.154 nm in Cu Kα ray), W: peak half width/degree, 0: incidence light/degree)

The above-described catalyst particles including platinum are supported on a carbon carrier. Preferably, carbon powder having a specific surface area of 50 $m^2/g$ or more and 1500 $m^2/g$ or less is applied for the carbon powder carrier. When the specific surface area is 50 $m^2/g$ or more, the area over which the catalyst deposited can be increased, so that catalyst particles can be dispersed at a high level to increase the effective surface area, and when the specific surface area is more than 1500 $m^2/g$, the abundance ratio of ultrafine pores (having a pore size of less than about 20 Å) which an ion-exchange resin hardly enter in formation of an electrode increases, so that the utilization efficiency of the catalyst particles is reduced.

In addition, the loading ratio of catalyst particles in the catalyst according to the present invention is preferably 25% or more and 70% or less in consideration of the performance of an electrode for a solid polymer fuel cell. The loading ratio is more preferably 50 to 60%, still more preferably 50 to 55%. The loading ratio in the present invention is a ratio of the mass of catalyst particles supported on a carrier (that is, the mass of supported platinum) to the mass of the entire catalyst.

As described above, the catalyst for solid polymer fuel cells according to the present invention meets a specific requirement associated with the state of platinum in catalyst particles. Preferably, the catalyst of the present invention has, in addition to this configuration-related characteristic, a qualitative characteristic such that the amount of platinum eluted in an acidic test solution under certain conditions is not less than a certain amount. Specifically, when the catalyst of the present invention is immersed in 0.5 M sulfuric acid at 60° C. for 48 hours, the amount of platinum eluted is preferably 5 ppm or less per 2 g of the catalyst. The present inventors point out that the amount of platinum eluted from a catalyst in an acidic solution has an effect on the durability of the catalyst. When the amount of platinum eluted is more than 5 ppm per 2 g of a catalyst, the catalyst has poor durability. The activity of such a catalyst is likely to be reduced with an increase in catalyst operation time. The lower limit of the amount of platinum eluted is preferably 0.1 ppm per 2 g of a catalyst. This is because a catalyst in which the amount of platinum eluted is smaller than the above-mentioned lower limit is presumed to have excessively small surface energy, and is therefore considered to have low catalytic activity.

A method for producing a catalyst for solid polymer fuel cells according to the present invention will now be described. The method for producing a catalyst for solid polymer fuel cells according to the present invention is based on a conventional liquid phase reduction method so far as basic process is concerned. In the liquid phase reduction method, a mixed solution is prepared by mixing a carbon power carrier with a platinum compound solution, a reducing agent is added to the mixed solution to reduce and precipitate platinum, and catalyst particles are supported on the carbon powder carrier to produce a platinum catalyst.

Here, in the present invention, the ratio of zerovalent platinum on the surfaces of the catalyst particles is 80% or more, more preferably 90% or more for obtaining a catalyst having favorable durability. A catalyst including such catalyst particles having a high ratio of zerovalent platinum is difficult to manufacture by a normal liquid phase reduction method. Studies conducted by the present inventors have revealed that the method for producing a catalyst including such catalyst particles includes two characteristic processes. The first characteristic process includes adding a platinum compound solution to a mixed system while grinding a carbon powder carrier in a step of preparing a mixed solution of the carbon powder carrier and the platinum compound solution. The second characteristic process includes performing heat treatment at a high temperature of 1000° C. or higher on the catalyst in which platinum is supported by reduction treatment.

Specifically, the method for producing a catalyst for solid polymer fuel cells of the present invention includes the steps of: preparing a mixed solution by mixing a carbon powder carrier with a platinum compound solution; adding a reducing agent to the mixed solution to support catalyst particles including platinum on the carbon powder carrier; and performing heat treatment on the carbon powder carrier supporting the catalyst particles, the mixed solution preparing step including mixing the carbon powder carrier with the platinum compound solution while grinding the carbon powder carrier, the heat treatment including heating the carbon powder carrier at a temperature of 1000° C. or higher and 1200° C. or lower. Hereinafter, the method for producing a catalyst according to the present invention will be described.

The platinum compound solution serving as a raw material for platinum which is a catalyst metal is preferably a dinitrodianmine platinum nitric acid solution, a chloroplatinate aqueous solution, a potassium chloroplatinate aqueous solution or a hexaammine platinum hydroxide solution. Since water is used as a solvent, the above-mentioned platinum complexes which are stable in an aqueous solution are preferable.

The platinum compound solution is mixed with carbon powder as a carrier to prepare a mixed solution. As described above, in the present invention, the operation of mixing a platinum compound solution with carbon powder while grinding the carbon powder is essential. The mixing step is for supporting platinum ions of the platinum compound solution on a carrier, and dictates platinum ion dispersibility and a supporting state. The present inventors point out that by grinding the carrier in the mixing step, the dispersion state of platinum ions is optimized. The present inventors believe that the dispersion state of platinum formed in the mixing step provides a foundation for the later-described high-temperature heat treatment to optimize the state of the surfaces of catalyst particles.

In the mixing step, the concentration of the platinum complex in the platinum compound solution is not particularly limited. A platinum compound solution having any concentration can be used while consideration is given to the amount of platinum to be supported. In the mixing step including the grinding treatment, the grinding treatment is preferably performed while adjusting the ratio of the amount of the platinum compound solution containing water to the amount of the carbon powder. Specifically, the grinding treatment is preferably performed while ensuring that the ratio of the weight of the carbon powder to the weight of the platinum compound solution is 1:75 to 1:1000. When the amount of the platinum compound solution is less than 75 g based on 1 g of the carbon powder, the viscosity of the mixed solution may increase, resulting in occurrence of irregular reaction in subsequent reduction treatment. On the other hand, when the platinum compound solution is used in an amount of more than 1000 g based on 1 g of the carbon powder, it is necessary to reduce the concentration of platinum in the platinum compound solution, so that subsequent reduction reaction hardly proceeds. The grinding treatment is preferably performed while the concentration of platinum in the platinum compound solution is set to 0.05% by mass or more and 5% by mass or less, and the ratio of the weight of the carbon powder to the weight of the platinum compound solution is set within the above-described range.

The grinding device in the grinding treatment is not particularly limited, and a colloid mill, a planetary ball mill or the like can be applied. The time during which the mixed solution is subjected to grinding is preferably 3 minutes or more and 60 minutes or less.

After the mixing step involving the grinding treatment, a reducing agent is added to the mixed solution of the platinum compound solution and the carbon fine powder carrier. The reducing agent is preferably an alcohol (methanol, ethanol or the like). A so-called modified alcohol obtained by mixing a small amount of methanol with ethanol can also be used. Preferably, the reducing agent is added in an amount of 4 mol or more and 280 mol or less based on 1 mol of platinum in the mixed solution, and at a concentration of 1% by volume or more and 60% by volume or less to the mixed solution.

As reflux (reduction) conditions after addition of the reducing agent, it is preferable that the temperature of the mixed solution is not lower than 60° C. and not higher than the boiling temperature, and the reduction time is 3 hours or more and 6 hours or less. Platinum particles are supported on the carrier by the reduction treatment.

In a normal liquid phase reduction method, a platinum catalyst can be completed when the reduction of platinum is completed, but in the present invention, only a catalyst precursor to be subjected to heat treatment is obtained in this stage. The catalyst precursor is recovered from the solution after reduction treatment, and appropriately dried.

The heat treatment on the catalyst precursor is a treatment performed for increasing the ratio of zerovalent platinum to the whole platinum by turning divalent or tetravalent platinum present on the surfaces of catalyst particles into zerovalent platinum. For catalysts in which an alloy is applied as catalyst particles (for example, alloy catalysts of platinum and cobalt and alloy catalysts of platinum and ruthenium) in the field of producing of catalysts, heat treatment is essential for alloy formation. In the present invention, catalyst particles including only platinum are applied, and therefore a heat treatment applied in the present invention is essentially different in technical sense from heat treatment for alloy formation. In the present invention, the heat treatment temperature is set to a relatively high temperature of 1000° C. or higher. This is because it is difficult to increase the ratio of zerovalent platinum at a heat treatment temperature of lower than 1000° C. It is to be noted that the heat treatment temperature is set to 1200° C. or lower for preventing coarsening of catalyst particles.

The heat treatment is performed preferably in a non-oxidizing atmosphere such as a reducing gas atmosphere or an inert gas atmosphere, especially preferably in a reducing gas atmosphere. Specifically, a hydrogen gas atmosphere (containing 50% or more of hydrogen gas) is preferable. The heat treatment time is preferably 3 minutes or more and 3 hours or less. By performing the above-mentioned heat treatment, a catalyst for solid polymer fuel cells according to the present invention is produced.

A catalyst subjected to a heat treatment, produced and completed as described above can also be subjected to additional/complementary treatment intended for obtaining an initial activity enhancing effect. As a result of the heat treatment, the state of the surfaces of catalyst particles is optimized. When additional treatment is performed within the bounds of not significantly changing the state, total catalyst performance can be enhanced.

Examples of the additional treatment include treatment of bringing the catalyst into contact with an oxidizing solution at least once. In a solid polymer fuel cell, protons produced on the surface of a catalyst are transferred through water and an electrolyte to generate power. Thus, it is preferable that the catalyst for solid polymer fuel cells has a certain level of hydrophilicity (wettability) from the viewpoint of catalytic activity. By bringing the platinum catalyst of the present invention into contact with an oxidizing solution, hydrophilic groups (hydroxyl groups, lactone groups, carboxyl groups and the like) are bonded to the surface of the carrier of the catalyst to impart hydrophilicity, so that initial activity can be enhanced.

The oxidizing solution in this treatment is preferably a solution of sulfuric acid, nitric acid, phosphorous acid, potassium permagnesium, hydrogen peroxide, hydrochloric acid, chloric acid, hypochlorous acid, chromic acid or the like. The concentration of such an oxidizing solution is preferably 0.1 to 1 mol/L, and immersing the catalyst in the solution is preferable.

As conditions for treatment with an oxidizing solution, the contact time is preferably 1 to 30 hours, more preferably 2 hours or more. The treatment temperature is preferably 40 to 110° C., more preferably 60° C. or higher. The oxidizing solution treatment may be performed by bringing the catalyst into contact with the oxidizing solution not only once but also two or more times repeatedly. When a plurality of acid treatments is performed, the type of solution may be changed for each treatment.

By treatment with an oxidizing solution as described above, hydrophilic groups are bonded to the carbon powder carrier of the catalyst at a density of 0.7 to 3.0 mmol/g (based on the weight of the carrier). The ratio of zerovalent platinum on the surfaces of catalyst particles might be slightly reduced by bringing the catalyst into contact with the oxidizing solution. However, as long as the above-described conditions are satisfied, the ratio of zerovalent platinum is not below 80%. Durability is not deteriorated, and a catalyst excellent in initial activity can be obtained.

Advantageous Effects of the Invention

The present invention allows to enhance the durability of a catalyst for polymer solid electrolyte fuel cells in which catalyst particles including platinum are applied as described above. The catalyst of the present invention has more excellent durability and higher initial activity as compared to conventional platinum catalysts.

BRIEF DESCRIPTION OF THE DRAWINGS

FIG. 4 show current-voltage curves in an initial activity test and a durability test for a catalyst in Comparative Example.

DESCRIPTION OF EMBODIMENTS

Figure 1:
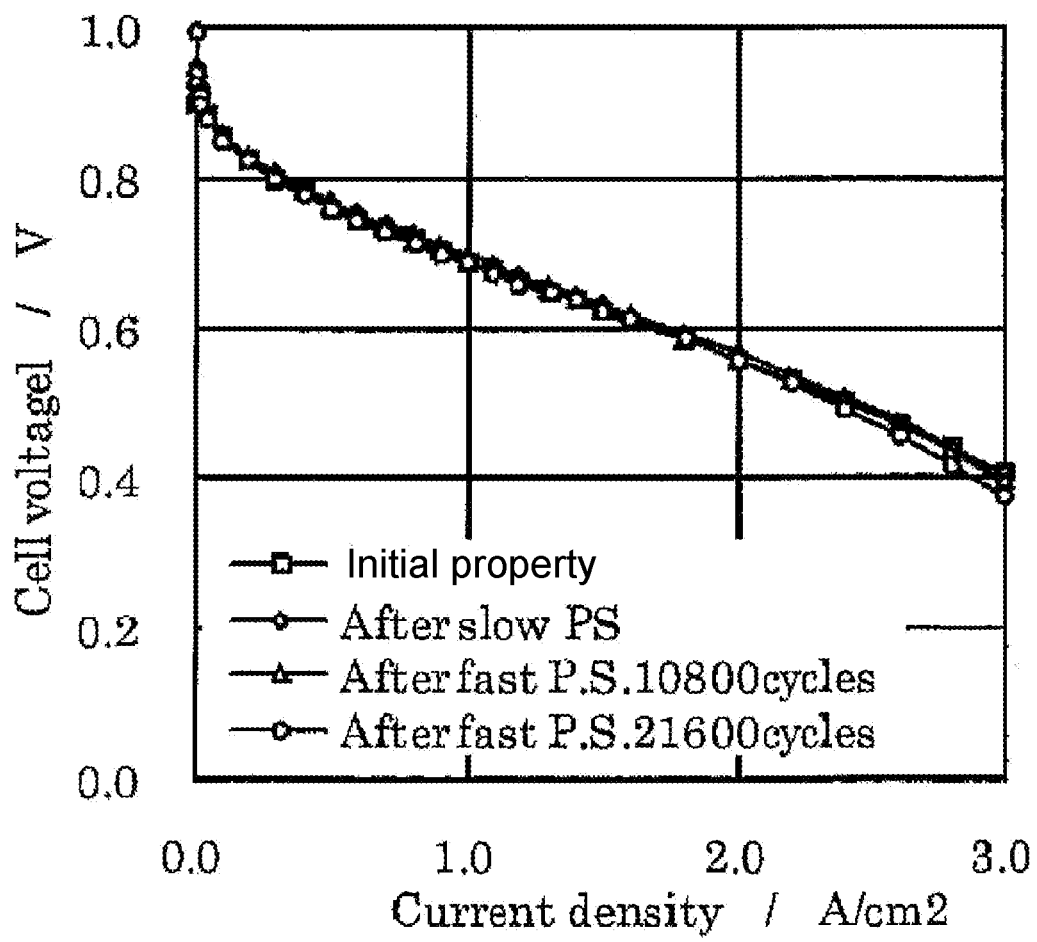
FIG. 1 show current-voltage curves in an initial activity test and a durability test for a catalyst of Example 1.

Hereinafter, preferred embodiments of the present invention will be described. In the embodiments, a platinum catalyst was produced by an improved liquid phase reduction method according to the present invention, proportions of platinum (zerovalent platinum, and divalent and tetravalent platinum) on the surfaces of catalyst particles were analyzed, and catalytic activity was evaluated and examined.

Example 1: In this example, platinum was supported by steps underlying the producing of a catalyst according to the present invention, i.e. a mixing step and a reduction step, and a heat treatment was performed at a high temperature to produce a catalyst. The steps will be described in detail below.

[Supporting Platinum]

A colloid mill was loaded with 4000 g of a dinitrodianmine platinum nitric acid solution (platinum content: 16 g) having a platinum concentration of 0.4% by weight and 16 g of carbon fine powder (specific surface area 810 $m^2/g$, trade name: Ketjen Black (manufactured by LION SPECIALTY CHEMICALS CO., Ltd.)) as a carrier. The ratio of the weight of the carbon powder to the weight of the platinum compound solution was set to 1:250.

Grinding treatment was performed for 30 minutes by the colloid mill, and a slurry mixed solution was transferred into a flask. To the slurry was added 600 mL of 100% ethanol as a reducing agent. The solution was stirred and mixed at a boiling point (about 95° C.) for 6 hours to support platinum on the carrier. Filtration and drying were performed to obtain a carrier supporting platinum particle. The loading concentration (loading amount) of platinum on the carrier supporting platinum particles was 47% by weight based on 100% by weight of the carrier.

[Heat Treatment]

The catalyst precursor was subjected to a heat treatment. The heat treatment was performed in a 100% hydrogen gas at a heat treatment temperature of 1050° C. for 2 hours. A platinum catalyst was obtained by the heat treatment. The loading ratio of platinum in the platinum catalyst of Example 1 was 51%, and the average particle size of the catalyst particles was 4.7 nm.

Example 2: In this example, the catalyst of Example 1 was subjected to additional treatment, i.e. treatment of adding hydrophilic groups by the below-described oxidizing solution, to produce a catalyst.

[Oxidizing Solution Treatment]

A part of the catalyst produced in Example 1 was picked, and subjected to oxidizing-solution treatment. Here, the catalyst after heat treatment was immersed in a 0.5 mol/L sulfuric acid aqueous solution at 80° C. for 2 hours, and then filtered, washed and dried. The catalyst was immersed in a 1.0 mol/L nitric acid aqueous solution at 70° C. for 2 hours, and then filtered, washed and dried. The treatment with the nitric acid aqueous solution was performed twice. A platinum catalyst containing hydrophilic groups was obtained by the above treatment. The loading ratio in the platinum catalyst of Example 2 was 50%, and the average particle size of the catalyst particles was 4.5 nm.

Example 3: In this example, the mixing ratio of a platinum compound solution and a carbon fine powder carrier was adjusted in a mixing step involving grinding treatment. At the time of supporting platinum in Example 1, 2400 g of a dinitrodianmine platinum nitric acid solution (platinum content: 9.6 g) and 2.4 g of carbon fine powder were ground and mixed in a colloid mill. The ratio of the weight of the carbon powder to the weight of the platinum compound solution was set to 1:107. Other steps were carried out in the same manner as in Example 1, and further, the same oxidizing-solution treatment as in Example 2 was performed. A platinum catalyst containing hydrophilic groups was thereby obtained. The loading ratio in the catalyst particles of the platinum catalyst of Example 3 was 30%, and the average particle size was 4.5 nm.

Comparative Example: As a comparative example for the catalysts of the examples described above, a platinum catalyst was produced by a conventional liquid phase reduction method. In Example 1, a carbon fine powder carrier was introduced into a dinitrodianmine platinum nitric acid solution, and the mixture was stirred to prepare a slurry without performing grinding treatment. Reduction treatment was performed in the same manner as in Example 1 to form a platinum catalyst without performing heat treatment after the reduction treatment. The loading density in the platinum catalyst of the comparative example was 48%, and the average particle size of the catalyst particles was 2.5 nm.

The platinum catalysts of Examples 1 to 3 and Comparative Example were subjected to XPS analysis, and the state of platinum on the surface (ratio of zerovalent platinum) was evaluated. For the XPS analysis, Quantera SXM manufactured by ULVAC-PHI, Inc. was used as an analyzer. For analysis, a platinum catalyst was fixed on a vacuum double-sided carbon tape as preparation of a sample. Here, a sufficient amount of the platinum catalyst was placed so as not to expose a backing tape portion, and the platinum catalyst was pressed from above a powder paper to form a flat surface. Thereafter, an excess sample was removed by a blower. As pretreatment of the sample, sputter etching was performed by use of an XPS-attached ion gun for evaluating a state in which surface contaminants of the platinum catalyst were removed. As a sputter condition, Ar ions were applied to the catalyst at an accelerating voltage of 1 kV (1 min).

As XPS analysis conditions, a monochromatized Al-Kα ray was used as an applied X-ray, the voltage was 15 kV, the power was 25 W, and the X-ray beam diameter was 200 μmφ. Generated photoelectric energy was detected to acquire a wide-area photoelectron spectrum (wide spectrum).

For calculating the ratio of zerovalent metallic platinum, the data of the Pt4f spectrum obtained by XPS was analyzed by use of software (MultiPak V8.2C) manufactured by ULVAC-PHI. In this analysis, "Pt" was associated with three chemical states (zerovalent Pt (0), divalent Pt (II) and tetravalent Pt (IV)). The main peak positions for the states were set at 71.7 eV for zerovalent Pt (0), 72.7 eV for divalent Pt (II) and 74.4 eV for tetravalent Pt (IV), and separation of peaks in the Pt4f spectrum measured by the software was performed. After the separation of peaks was performed, the ratio of each Pt was calculated from the area ratio of the peak for each state.

For the catalysts in each of examples and the comparative example, an elution test with sulfuric acid was conducted to measure the amount of platinum eluted. In the elution test, 2 g of the catalyst was weighed, and added in an Erlenmeyer flask containing 150 mL of sulfuric acid (0.5 mol/L). The Erlenmeyer flask was placed in a dryer set at 60° C., and the mixture was stirred while air was supplied into the sulfuric acid solution at a rate of 50 mL/min. The mixture was left standing in this state for 48 hours, the catalyst was then filtered and recovered, and the filtrate was transferred into a measuring flask, and diluted to 250 mL (filtrate A). The recovered catalyst was returned into the Erlenmeyer flask, 150 mL of warm pure water was added, and the mixture was stirred for 30 minutes in a dryer set at 60° C. Thereafter, the catalyst was then filtered and recovered, and the filtrate was transferred into a measuring flask, and diluted to 250 mL (filtrate B). The obtained filtrate A and filtrate B were analyzed by ICP, and the platinum concentration of each of the filtrates was measured. The sum of the platinum concentrations of filtrates A and B ((platinum concentration of filtrate A)+(platinum concentration of filtrate B)) was defined as the amount of eluted platinum of the catalyst.

The values of various physical properties measured as described above are shown in Table 1.

TABLE 1

| | Pt state ratio (%) | | | |
|---|---|---|---|---|
| | Pt (Pt$^0$) | PtO$_2$ (Pt$^{2+}$) | PtO$_2$, Pt(OH)$_4$ (Pt$^{4+}$) | Amount of Pt eluted (ppm) |
| Example 1 | 100 | 0 | 0 | 1.28 |
| Example 2 | 94 | 4 | 2 | 0.20 |
| Example 3 | 90 | 7 | 3 | 0.50 |
| Comparative Example | 67 | 25 | 8 | 9.71 |

It can be confirmed from Table 1 that in the catalysts of Examples 1 to 3, the ratio of zerovalent platinum on the surfaces of catalyst particles is 80% or more. In Comparative Example, divalent platinum and tetravalent platinum were present in a large amount on the surfaces of catalyst particles, and thus the ratio of zerovalent platinum was below 70%. The amount of platinum eluted was 2 ppm or less for the catalysts of examples, and 9 ppm or more for the catalyst of the comparative example. A catalyst having a high ratio of zerovalent platinum has a small amount of platinum eluted. For each catalyst, initial activity was evaluated on the basis of the physical property values examined as described above, and durability was then evaluated.

[Initial Activity Test]

The platinum catalysts according to examples and the comparative example were subjected to an initial activity test. This performance test was conducted by measuring the mass activity. In the experiment, a single cell was used, and a membrane electrode assembly (MEA) obtained by sandwiching a proton conductive polymer electrolyte membrane between cathode and anode electrodes having an electrode area of 25 cm$^2$ (5 cm×5 cm) was prepared, and evaluated (set utilization efficiency: 40%). As pretreatment, a current-voltage curve was prepared under the conditions of a hydrogen flow rate of 1000 mL/min, an oxygen flow rate of 1000 mL/min, a cell temperature of 80° C., an anode humidified temperature of 90° C. and a cathode humidified temperature of 30° C.

[Durability Test]

Further, each catalyst was subjected to a durability test (degradation test) for evaluating durability. The durability test was conducted by subjecting the membrane electrode assembly (MEA) after the initial activity test to a potential cycle test. In the potential cycle test, sweeping was performed between 650 mV and 1050 mV at a sweeping speed of 40 mV/s for 20 hours to clean the surfaces of catalyst particles. Thereafter, sweeping was performed between 650 mV and 1050 mV at a sweeping speed of 100 mV/s over 10800 cycles to degrade the catalyst, and a current-voltage curve was then prepared. Thereafter, sweeping was further performed over 10800 cycles (a total of 216000 cycles) to degrade the catalyst, and a current-voltage curve was prepared.

Figure 2:
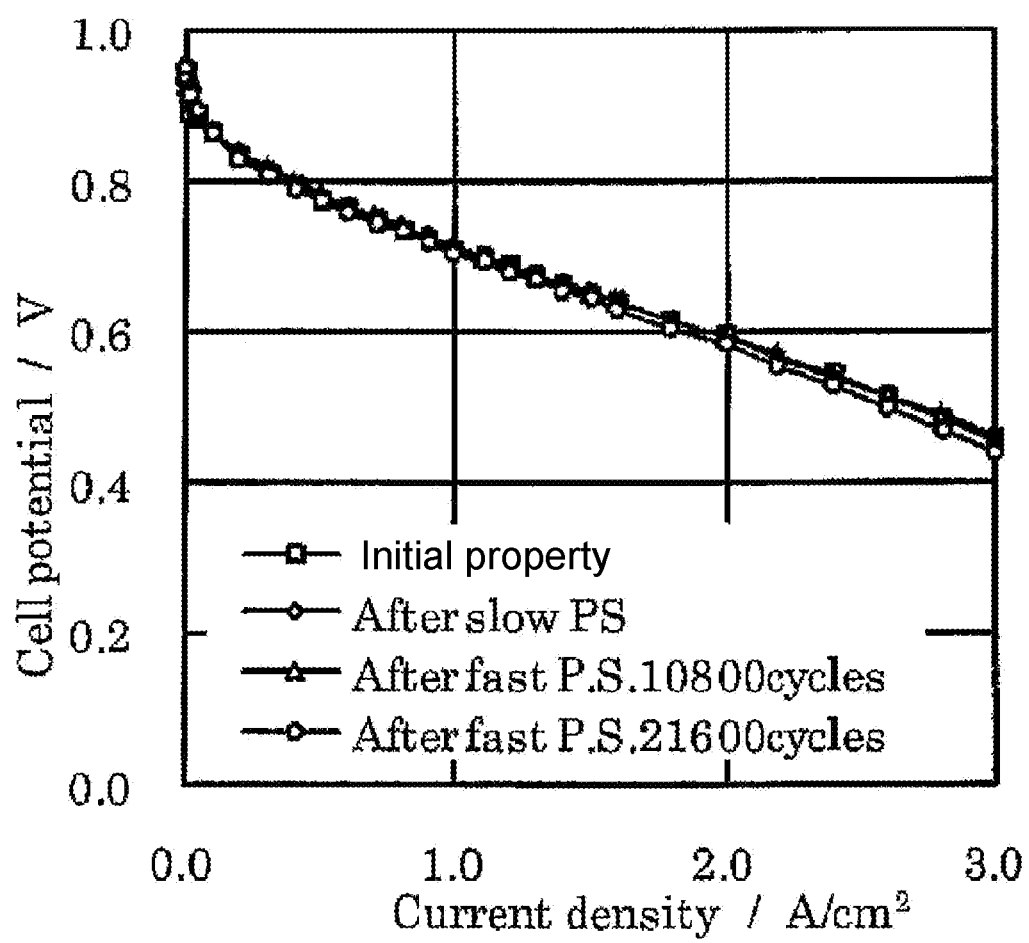
FIG. 2 show current-voltage curves in an initial activity test and a durability test for a catalyst of Example 2.
Figure 3:
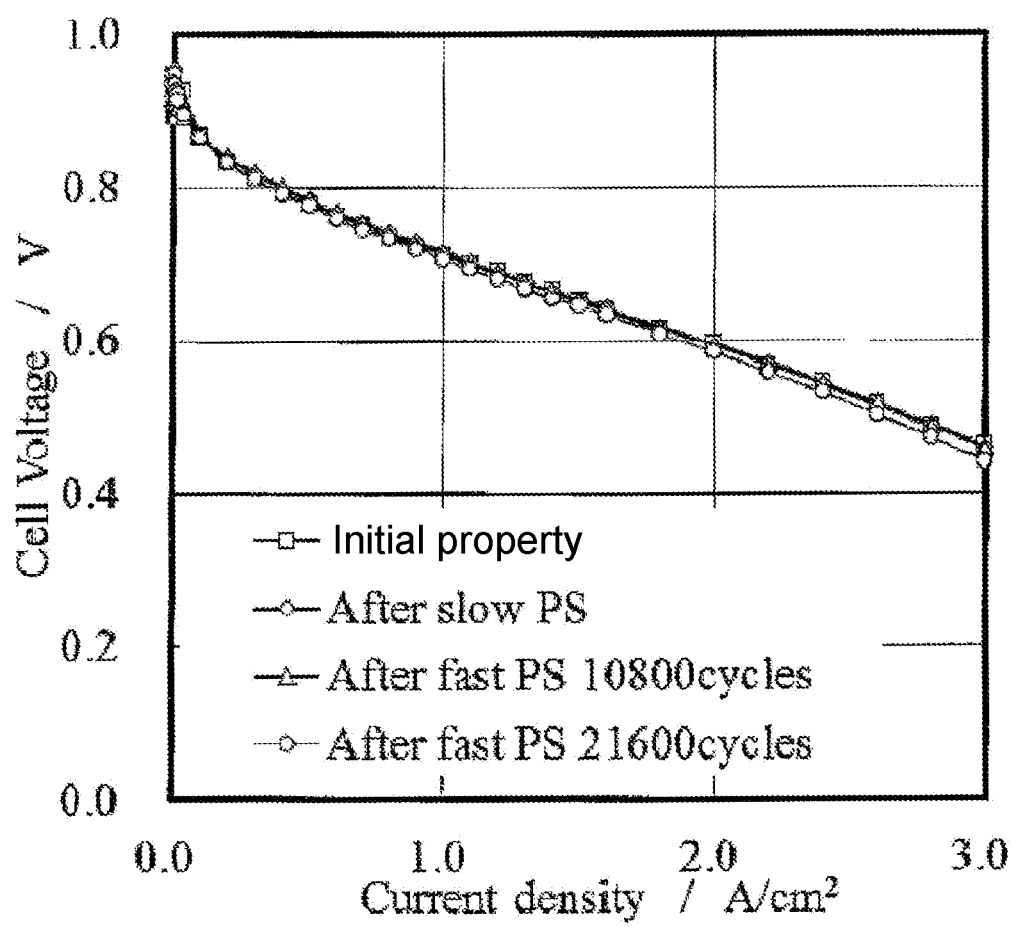
FIG. 3 show current-voltage curves in an initial activity test and a durability test for a catalyst of Example 3.

FIG. 1 to FIG. 4 show current-voltage curves in initial activity tests and durability tests (in cleaning, after 10800 cycles and after 21600 cycles) for the catalysts of Examples 1 to 3 and Comparative Example. FIG. 4 (Comparative Example) reveals that in the conventional art, the activity is reduced as the number of cycles increases. On the other hand, in the catalysts of FIG. 1 (Example 1), FIG. 2 (Example 2) and FIG. 3 (Example 3), reduction of activity is extremely small, and excellent durability is exhibited. For presenting this point more clearly, voltage values (V) at a current of 1.0 A/cm$^2$ were determined on the basis of the current/voltage curves of FIG. 1 to FIG. 4. The results thereof are shown in Table 2.

TABLE 2

| | Voltage at 1.0 A/cm$^2$ (V) | | |
| --- | --- | --- | --- |
| | Initial activity | 10800 cycles | 21600 cycles |
| Example 1 | 0.695 | 0.690 | 0.685 |
| Example 2 | 0.710 | 0.705 | 0.700 |
| Example 3 | 0.714 | 0.716 | 0.707 |
| Comparative Example | 0.690 | 0.635 | 0.620 |

Table 2 also reveals that in the catalysts of Examples 1 to 3, reduction of activity is extremely small, and high durability is exhibited. Specifically, with regard to the reduction ratio of the voltage value after 21600 cycles, the voltage was reduced by about 10% in the catalyst of the comparative example, whereas the voltage was reduced by less than 2% in the catalysts of examples. It is evident that the catalysts of examples have high durability.

In evaluation performed in terms of initial activity alone, the oxidizing solution-treated platinum catalysts of Examples 2 and 3 are excellent. The catalysts of Examples 2 and 3 have extremely high durability as described above. Indeed, the catalyst of Example 1 has initial activity equal to or higher than that in the conventional art. The catalyst of Example 1 is superior in durability to the conventional art, and is therefore an excellent catalyst. It is considered that the above effects were obtained by optimizing the ratio of zerovalent platinum in catalyst particles.

INDUSTRIAL APPLICABILITY

The present invention allows to improve the durability of an electrode catalyst for solid polymer fuel cells. The present invention contributes to practical realization and popularization of fuel cells, and hence provides a foundation for environmental problem solution.

The invention claimed is:

1. A catalyst for solid polymer fuel cells in which catalyst particles consisting essentially of platinum are supported on a carbon powder carrier, wherein
a ratio of zerovalent platinum to platinum present on surfaces of the catalyst particles is 80% or more and 100% or less.

2. The catalyst for solid polymer fuel cells according to claim 1, wherein an amount of platinum eluted at a time of immersing the catalyst in 0.5 M sulfuric acid at 60° C. for 48 hours is 0.1 ppm or more and 5.0 ppm or less per 2 g of the catalyst.

3. The catalyst for solid polymer fuel cells according to claim 1, wherein the catalyst particles have a particle size of 2 nm or more and 20 nm or less.

4. The catalyst for solid polymer fuel cells according to claim 1, wherein a catalyst ratio to the whole catalyst is 25 to 70% on a mass basis.

5. A method for producing the catalyst for solid polymer fuel cells defined in claim 1, comprising the steps of:
preparing a mixed solution by mixing a carbon powder carrier with a platinum compound solution;
adding a reducing agent to the mixed solution to support catalyst particles including platinum on the carbon powder carrier; and
performing a heat treatment on the carbon powder carrier supporting the catalyst particles, wherein
the step of preparing a mixed solution preparing step is for mixing the carbon powder carrier with the platinum compound solution while grinding the carbon powder carrier, and
the heat treatment is for heating the carbon powder carrier at a temperature of 1000° C. or higher and 1200° C. or lower.

6. The method for producing the catalyst for solid polymer fuel cells according to claim 5, comprising a step of bringing the catalyst after heat treatment into contact with an oxidizing solution at least once.

7. The method for producing the catalyst for solid polymer fuel cells according to claim 6, wherein the step of bringing the catalyst into contact with at least one oxidizing solution selected from a group including solutions of sulfuric acid, nitric acid, phosphorous acid, potassium permanganate, hydrogen peroxide, hydrochloric acid, chloric acid, hypochlorous acid and chromic acid.

8. The catalyst for solid polymer fuel cells according to claim 2, wherein the catalyst particles have a particle size of 2 nm or more and 20 nm or less.

9. The catalyst for solid polymer fuel cells according to claim 2, wherein a catalyst ratio to the whole catalyst is 25 to 70% on a mass basis.

10. The catalyst for solid polymer fuel cells according to claim 3, wherein a catalyst ratio to the whole catalyst is 25 to 70% on a mass basis.

11. A method for producing the catalyst for solid polymer fuel cells defined in claim 2, comprising the steps of:
preparing a mixed solution by mixing a carbon powder carrier with a platinum compound solution;
adding a reducing agent to the mixed solution to support catalyst particles including platinum on the carbon powder carrier; and
performing a heat treatment on the carbon powder carrier supporting the catalyst particles, wherein
the step of preparing a mixed solution preparing step is for mixing the carbon powder carrier with the platinum compound solution while grinding the carbon powder carrier, and
the heat treatment is for heating the carbon powder carrier at a temperature of 1000° C. or higher and 1200° C. or lower.

12. The method for producing the catalyst for solid polymer fuel cells according to claim 11, comprising a step of bringing the catalyst after heat treatment into contact with an oxidizing solution at least once.

13. The method for producing the catalyst for solid polymer fuel cells according to claim 12, wherein the step of bringing the catalyst into contact with at least one oxidizing solution selected from a group including solutions of sulfuric acid, nitric acid, phosphorous acid, potassium permanganate, hydrogen peroxide, hydrochloric acid, chloric acid, hypochlorous acid and chromic acid.

14. A method for producing the catalyst for solid polymer fuel cells defined in claim 3, comprising the steps of:
preparing a mixed solution by mixing a carbon powder carrier with a platinum compound solution;

adding a reducing agent to the mixed solution to support catalyst particles including platinum on the carbon powder carrier; and performing a heat treatment on the carbon powder carrier supporting the catalyst particles, wherein the step of preparing a mixed solution preparing step is for mixing the carbon powder carrier with the platinum compound solution while grinding the carbon powder carrier, and the heat treatment is for heating the carbon powder carrier at a temperature of 1000° C. or higher and 1200° C. or lower.

15. The method for producing the catalyst for solid polymer fuel cells according to claim 14, comprising a step of bringing the catalyst after heat treatment into contact with an oxidizing solution at least once.

16. The method for producing the catalyst for solid polymer fuel cells according to claim 15, wherein the step of bringing the catalyst into contact with at least one oxidizing solution selected from a group including solutions of sulfuric acid, nitric acid, phosphorous acid, potassium permanganate, hydrogen peroxide, hydrochloric acid, chloric acid, hypochlorous acid and chromic acid.

17. A method for producing the catalyst for solid polymer fuel cells defined in claim 4, comprising the steps of:

preparing a mixed solution by mixing a carbon powder carrier with a platinum compound solution;

adding a reducing agent to the mixed solution to support catalyst particles including platinum on the carbon powder carrier; and performing a heat treatment on the carbon powder carrier supporting the catalyst particles, wherein the step of preparing a mixed solution preparing step is for mixing the carbon powder carrier with the platinum compound solution while grinding the carbon powder carrier, and the heat treatment is for heating the carbon powder carrier at a temperature of 1000° C. or higher and 1200° C. or lower.

18. The method for producing the catalyst for solid polymer fuel cells according to claim 17, comprising a step of bringing the catalyst after heat treatment into contact with an oxidizing solution at least once.

19. The method for producing the catalyst for solid polymer fuel cells according to claim 17, wherein the step of bringing the catalyst into contact with at least one oxidizing solution selected from a group including solutions of sulfuric acid, nitric acid, phosphorous acid, potassium permanganate, hydrogen peroxide, hydrochloric acid, chloric acid, hypochlorous acid and chromic acid.

* * * * *